United States Patent
Ko et al.

(10) Patent No.: US 9,491,423 B2
(45) Date of Patent: Nov. 8, 2016

(54) PROJECTION DEVICE

(71) Applicant: Coretronic Corporation, Hsin-Chu (TW)

(72) Inventors: Tung-Yi Ko, Hsin-Chu (TW); I-Hsien Liu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 14/848,346

(22) Filed: Sep. 9, 2015

(65) Prior Publication Data
US 2016/0295177 A1 Oct. 6, 2016

(30) Foreign Application Priority Data

Mar. 30, 2015 (CN) .......................... 2015 1 0143774

(51) Int. Cl.
*H04N 9/31* (2006.01)
*H04N 5/64* (2006.01)

(52) U.S. Cl.
CPC .......... *H04N 9/3144* (2013.01); *H04N 9/3164* (2013.01)

(58) Field of Classification Search
CPC ........ H04N 9/31; H04N 5/64; H04N 9/3144; H04N 9/3164; G03B 21/28; G03B 21/16; G03B 21/20
USPC ................................................. 348/744–747
See application file for complete search history.

(56) References Cited

U.S. PATENT DOCUMENTS

| 7,140,734 | B2* | 11/2006 | Lim | G03B 21/16 348/748 |
| 8,016,432 | B2* | 9/2011 | Chang | G03B 21/28 348/745 |
| 9,400,418 | B2* | 7/2016 | Hu | G03B 21/16 |
| 2011/0032490 | A1* | 2/2011 | Hsiao | G03B 21/16 353/58 |
| 2012/0163828 | A1 | 6/2012 | Lindberg et al. | |

FOREIGN PATENT DOCUMENTS

CN 102466957 5/2012

* cited by examiner

*Primary Examiner* — Trang U Tran
(74) *Attorney, Agent, or Firm* — Jianq Chyun IP Office (57) ABSTRACT

A projection device including a housing, an optical engine, and a power connector is provided. The housing has a front end portion, a rear end portion opposite to the front end portion, and a projection opening. The optical engine is disposed within the housing and includes a projection lens, a first light-emitting element, and a second light-emitting element. The projection lens is adapted to output an image beam through the projection opening. The first light-emitting element and the second light-emitting element are respectively thermally coupled to a first coupling portion and a second coupling portion of the housing. The housing has a heat separation for separating the first coupling portion and the second coupling portion. The power connector is connected to the rear end portion.

17 Claims, 5 Drawing Sheets

PROJECTION DEVICE

CROSS-REFERENCE TO RELATED APPLICATION

This application claims the priority benefit of China application serial no. 201510143774.4, filed on Mar. 30, 2015. The entirety of the above-mentioned patent application is hereby incorporated by reference herein and made a part of this specification.

BACKGROUND OF THE INVENTION

1. Field of the Invention

The invention generally relates to a projection device.

2. Description of Related Art

A projector is a display device for generating a large size image. The projector is to convert an illumination beam generated by a light source module into an image beam through a light valve, and then project the image beam onto a projection screen or a wall surface through a projection lens, so as to form an image. As advances in projection technology and a reduction in manufacturing cost, the applications of the projector have extended gradually from commercial uses to family uses.

The projector is usually placed on a desktop, hanged under the ceiling via a support frame, or set up on the ground. In addition, in terms of power supply, the projector is usually connected to a power outlet (e.g., an indoor power socket) through an independent power cord.

In order to generate illumination beams of different colors such as three primary colors (red, green and blue), the projector may uses multiple (e.g. three) light-emitting elements (e.g., LEDs or other solid state light sources) for respectively providing the color beams (e.g. the illumination beams of three primary colors). The light-emitting elements are usually thermally coupled to a heat dissipation module, such as a heat sink or a heat dissipation fin, so as to discharge heat generated during operation. Because each light-emitting element would generate heat and has its temperature when providing illumination beams of the corresponding color, if multiple light-emitting elements thermally coupled to the same one heat dissipation module, the temperature of one light-emitting element may increase due to receiving heat generated from other light-emitting element, and thereby the operation lives of the light-emitting elements will be affected.

In order for heat dissipation, the projector may use active airflow provided by a fan with the heat dissipation module to cool the light-emitting elements, so as to prolong the lives of the light-emitting elements. However, the fan may produce noises during operation.

The information disclosed in the "BACKGROUND OF THE INVENTION" section is only for enhancement of understanding of the background of the described technology, and therefore it may contain information that does not form the prior art that is already known to a person of ordinary skill in the art. Further, the information disclosed in the "BACKGROUND OF THE INVENTION" section does not mean that one or more problems to be resolved by one or more embodiments of the invention was acknowledged by a person of ordinary skill in the art.

SUMMARY OF THE INVENTION

The invention is directed to a projection device for reducing a mutual influence between temperatures of light-emitting elements, so as to increase the operation life of the light-emitting elements.

The invention is directed to a projection device capable of cooling light-emitting elements and electronic components by means of natural airflow, so as to achieve the purpose of heat dissipation and avoid noises generated by operation of a fan.

The invention is directed to a projection device configured to be directly connected to a power supply socket without using a power cord.

Other objectives and advantages of the invention may be further understood from the technical features broadly embodied and disclosed as follows.

To achieve one, some or all of the above-mentioned objectives or other objectives, a projection device is provided in one embodiment of the invention. The projection device includes a housing, an optical engine, and a power connector. The housing has a front end portion, a rear end portion opposite to the front end portion, and a projection opening. The optical engine is disposed within the housing and includes a projection lens, a first light-emitting element, and a second light-emitting element. The projection lens is adapted to output an image beam through the projection opening. The first light-emitting element and the second light-emitting element are respectively thermally coupled to a first coupling portion and a second coupling portion of the housing. The housing has a heat separation for separating the first coupling portion and the second coupling portion. The power connector is connected to the rear end portion of the housing for plugging into a power supply socket, so as to supply power to the optical engine.

In one embodiment of the invention, the heat separation includes an elongated slot, and the elongated slot is located between the first coupling portion and the second coupling portion.

In one embodiment of the invention, the elongated slot is extended between the first coupling portion and the second coupling portion.

In one embodiment of the invention, the elongated slot is tortuously extended between the first coupling portion and the second coupling portion.

In one embodiment of the invention, the heat separation includes a plurality of slots, and the slots are arranged along a line between the first coupling portion and the second coupling portion.

In one embodiment of the invention, an extending direction of the slots is parallel to the line.

In one embodiment of the invention, an extending direction of the slots is oblique to the line.

In one embodiment of the invention, the housing includes a front end plate, and the projection opening is foil led at the front end plate.

In one embodiment of the invention, the front end plate has a plurality of cooling vents, and the cooling vents are arranged around the projection opening.

In one embodiment of the invention, the optical engine further includes a third light-emitting element, and the third light-emitting element is fixed to the front end plate.

In one embodiment of the invention, a material of the front end portion includes metal, and a material of the rear end portion includes plastic.

In one embodiment of the invention, the housing has a plurality of through holes, and the through holes are formed at the rear end portion for communicate the inside of the housing with the outside of the housing.

In one embodiment of the invention, the power connector is an E27 lamp cap.

In one embodiment of the invention, the power connector is a power plug.

In one embodiment of the invention, the projection device further includes an electronic device, and the electronic device is disposed within the housing and electrically connected to the optical engine and the power connector.

In one embodiment of the invention, the electronic device includes a power supply device and a wireless communication device. The power supply device is electrically connected to the power connector for providing power the optical engine. The wireless communication device is configured to wirelessly connect to an external signal source, to receive an image signal provided by the external signal source, and to transmit the image signal to the optical engine.

In one embodiment of the invention, there is no fan within the housing.

The embodiments of the invention at least may have one of the following advantages. The mutual influence between the temperatures of the two light-emitting elements can be reduced by thermally coupling the two light-emitting elements to the two adjacent coupling portions of the housing and by separating the two adjacent coupling portions using a heat separation. In addition, the power connector is connected to the rear end portion of the housing and can be directly plugged into the power supply socket to obtain the power.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
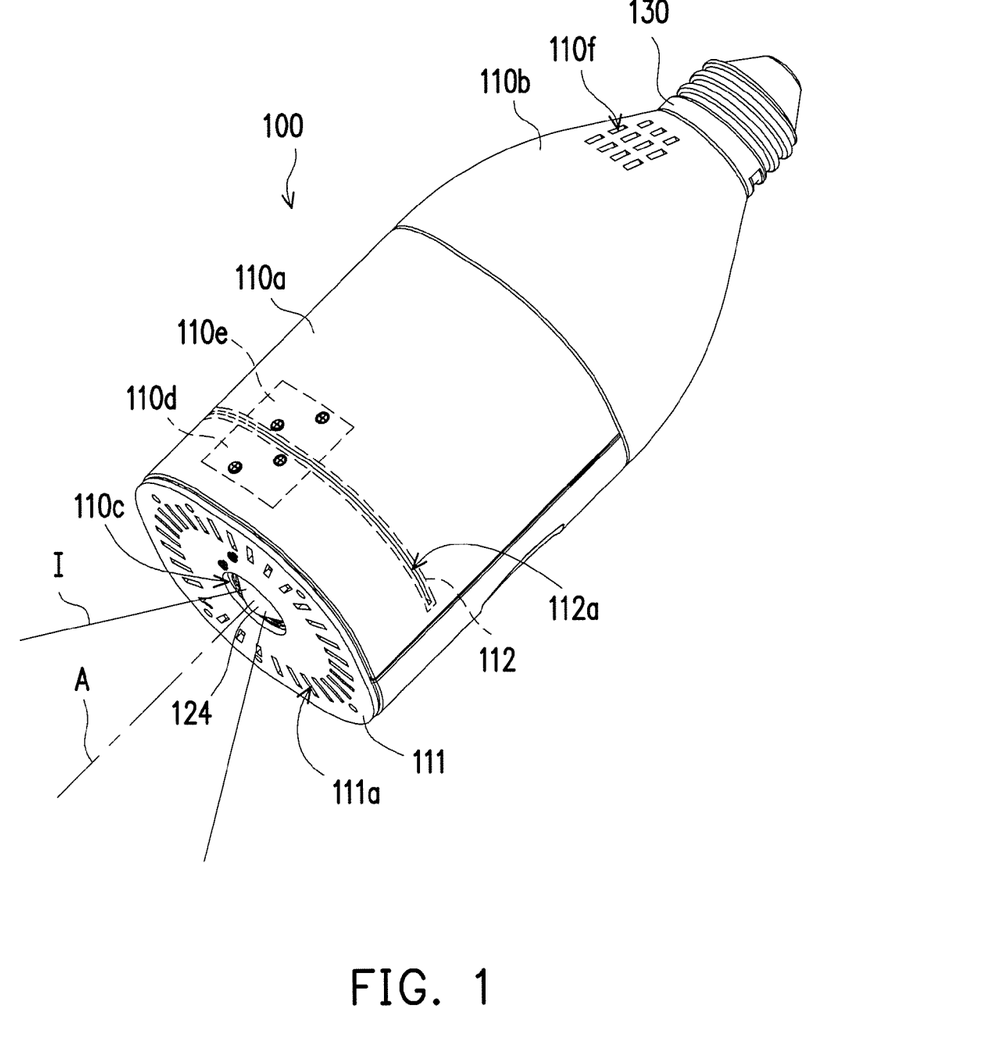
FIG. 1 is a perspective view illustrating a projection device according to an embodiment of the invention.
Figure 2:
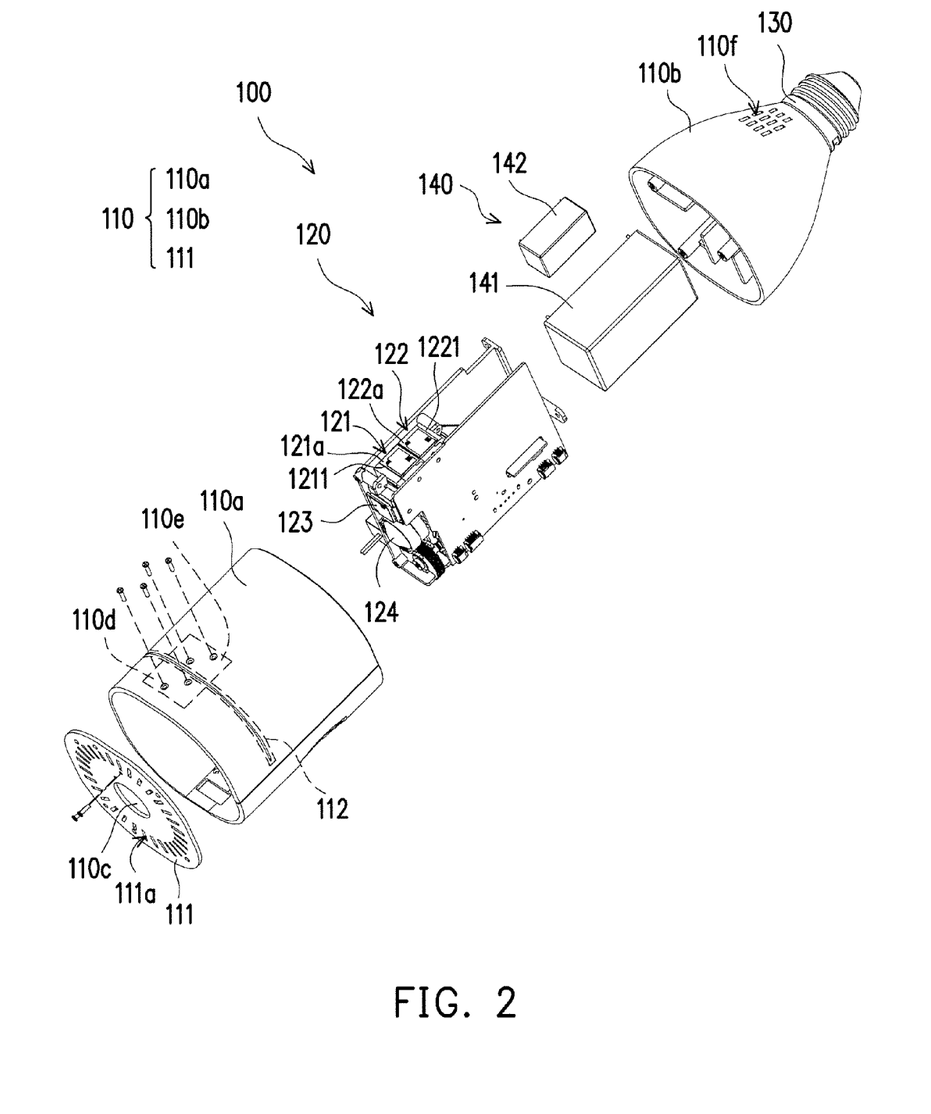
FIG. 2 is an exploded view of the projection device of FIG. 1.

Referring to FIG. 1 and FIG. 2, in the present embodiment, a projection device 100 includes a housing 110, an optical engine 120, and a power connector 130. The housing 110 has a front end portion 110a and a rear end portion 110b opposite to the front end portion 110a. As exemplarily indicated in FIG. 2, the front end portion 110a has a tube-like shape, and the front end portion 110a may be connected to the rear end portion 110b as indicated in FIG. 1. However, the invention is not limited. For example, in one embodiment, the cross section of the front end portion 110a may be rectangular. The optical engine 120 is disposed within the housing 110 and has a projection lens 124. The projection lens 124 outputs an image beam I through a projection opening 110c of the housing 110. The optical engine 120 has a first light-emitting element 121 and a second light-emitting element 122. Each of the first light-emitting element 121 and second light-emitting element 122 includes, for example, a light emitting diode, a laser diode, or a solid state light source, but the invention is not limited thereto. The first light-emitting element 121 and the second light-emitting element 122 are respectively thermally coupled to the housing 110, by using, for example, screws. The power connector 130 is connected to the rear end portion 110b of the housing 110 for plugging into a power supply socket, so as to supply power to an electronic device (e.g., the optical engine 120) in the projection device 100.

Referring to FIG. 1 and FIG. 2, in the present embodiment, the first light-emitting element 121 and the second light-emitting element 122 are respectively thermally coupled to a first coupling portion 110d and a second coupling portion 110e of the housing 110. In one embodiment, as exemplarily indicated in FIG. 1, FIG. 2, and FIG. 3A, the first coupling portion 110d is corresponding to the first light-emitting element 121. The area of the first coupling portion 110d may be equal or larger than the size of the circuit board 121a of the first light-emitting element 121, which may cover the first light-emitting element 121. Similarly, the second coupling portion 110e is corresponding to the second light-emitting element 122. The area of the second light-emitting element 122 may be equal or larger than the size of the circuit board 122a of the second light-emitting element 122, which may cover the second light-emitting element 122. The first light-emitting element 121 and the second light-emitting element may be disposed side by side. The housing 110 has a heat separation 112 for separating the first coupling portion 110d and the second coupling portion 110e. Hence, heat generated during operation of the first light-emitting element 121 and second light-emitting element 122 may respectively be transferred to other parts of the housing 110 through the first coupling portion 110d and the second coupling portion 110e. In addition, because each of the first light-emitting element 121 and the second light-emitting element 122 has its temperature when the first light-emitting element 121 and the second light-emitting element 122 are under operation, the heat separation 112 located between the first coupling portion 110d and the second coupling portion 110e can reduce a mutual influence between temperatures of the first light-emitting element 121 and the second light-emitting element 122 (i.e., the influence of heat generated by the second light-emitting element 122 on the first light-emitting element 121, which may increase the temperature of the first light-emitting element 121, can be reduced, and the influence of heat generated by the first light-emitting element 121 on the second light-emitting element 122, which may increase the temperature of the second light-emitting element 122, can be reduced), so that the temperature of the first light-emitting element 121 would not increase caused by the temperature of the second light-emitting element 122, and vice versa, and thereby the operation lives of the first light-emitting element 121 and the second light-emitting element 122 can be prolonged.

Figure 3A:
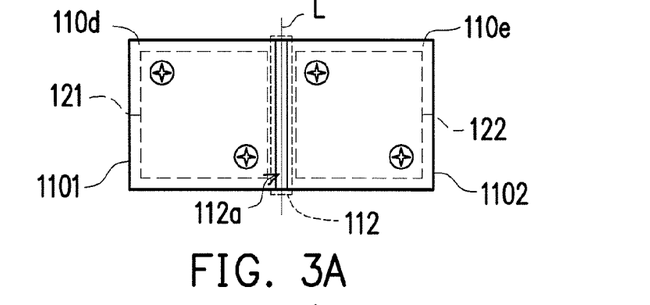
FIG. 3A is a diagram illustrating a positional relationship between a part of a housing and two light-emitting elements of the projection device of FIG. 1.
Figure 3B:
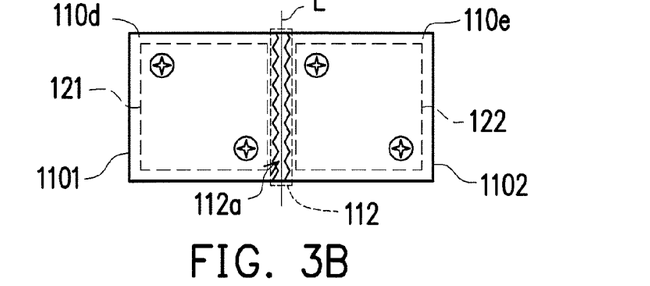
FIG. 3B is a diagram illustrating a positional relationship between a part of a housing and two light-emitting elements of a projection device according to another embodiment of the invention.
Figure 3C:
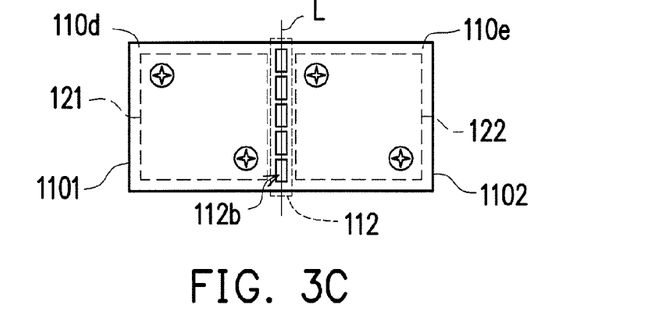
FIG. 3C is a diagram illustrating a positional relationship between a part of a housing and two light-emitting elements of a projection device according to another embodiment of the invention.
Figure 3D:
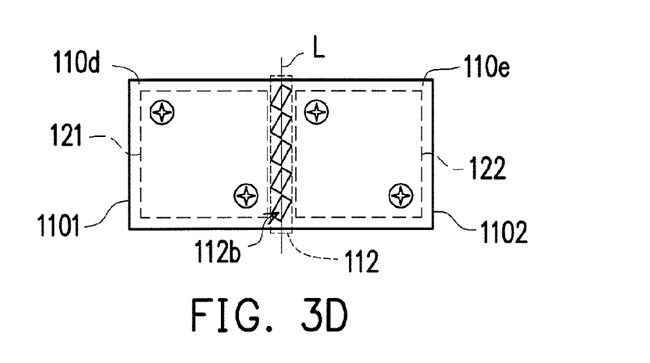
FIG. 3D is a diagram illustrating a positional relationship between a part of a housing and two light-emitting elements of a projection device according to another embodiment of the invention.

Referring to FIG. 1, in the present embodiment, the heat separation 112 includes an elongated slot 112a, and the elongated slot 112a is located between the first coupling portion 110d and the second coupling portion 110e. In the present embodiment, as shown in FIG. 1 and FIG. 3A, the elongated slot 112a is extended between the first coupling portion 110d and the second coupling portion 110e. In one embodiment, as exemplarily shown in FIG. 1 and FIG. 3A, the elongated slot 112a is extended substantially along a side 1211 of the first light-emitting element 121 and a side 1221 of the second light-emitting element 122. In another embodiment, when the front end portion 110a has the tube-like shape, the elongated slot 112a may be extended along an annular direction, as exemplarily indicated in FIG. 1. In one or more embodiments, the extent of the heat separation 112 is equal or larger than a length 1101 of the first coupling portion 110d and a length 1102 of the second coupling portion 110e, as exemplarily indicated in FIGS. 3A to 3D. However, the invention is not limited thereto and the direction of the extension may depend on the arrangement of the first light-emitting element 121 and the second light-emitting element 122. In another embodiment, as shown in FIG. 3B, as compared to the embodiment of FIG. 3A, the elongated slot 112a can tortuously (e.g. sawtooth shape) extend between the first coupling portion 110d and the second coupling portion 110e. In another embodiment, as shown in FIG. 3C, the heat separation 112 includes a plurality of slots 112b, and the slots 112b are arranged substantially along a line L between the first coupling portion 110d and the second coupling portion 110e, and an extending direction of the slots 112b is substantially parallel to the line L. In another embodiment, as shown in FIG. 3D, as compared to the embodiment of FIG. 3C, the extending direction of the slots 112b may be oblique to the line L.

Referring to FIG. 1 and FIG. 2 again, in the present embodiment, the housing 110 further includes a front end plate 111, and the projection opening 110c is formed at the front end plate 111. The front end plate 111 has a plurality of cooling vents 111a, and the cooling vents 111a are arranged around the projection opening 110c, so as to discharge hot air generated within the housing 110 through the cooling vents 111a. The optical engine 120 may further have a third light-emitting element 123. The third light-emitting element 123 may be fixed to the front end plate 111, by using, for example, screws. The third light-emitting element 123 includes, for example, a light emitting diode, a laser diode, or a solid state light source, but the invention is not limited thereto. When a material of the front end plate 111 is a thermal conductive material (e.g., metal), the third light-emitting element 123 may be thermally coupled to the front end plate 111 of the housing 110, so that the front end plate 111 may assist in a heat dissipation of the third light-emitting element 123. In the present embodiment, the first light-emitting element 121 may include a red light-emitting element, the second light-emitting element 122 may include a green light-emitting element, and the third light-emitting element 123 may include a blue light-emitting element, but the invention is not limited thereto. Since the light-emitting elements (namely, the first light-emitting element 121, the second light-emitting element 122 and the third light-emitting element 123) are respectively thermally coupled to a plurality of portions of the housing 110 (namely, the first coupling portion 110d, the second coupling portion 110e, and the front end plate 111) and can be cooled directly through the housing 110, disposition of a traditional fan may not be necessary and can be omitted, and thereby reduces the noise generated during the operation of the projection device 100.

Referring to FIG. 1 and FIG. 2 again, in the present embodiment, the material of the front end portion 110a of the housing 110 may include metal, so as to provide the first light-emitting element 121 and the second light-emitting element 122 a better heat dissipation effect. The material of the rear end portion 110b of the housing 110 may include plastic, so as avoid influence on operation of the internal elements of the housing 110 with devices outside of the housing 110. Specifically, in one embodiment, the projection device 100 may further include an electronic device 140, and the electronic device 140 is disposed within the housing 110 and electrically connected to the optical engine 120 and the power connector 130. In the present embodiment, the electronic device 140 may include a power supply device 141 and a wireless communication device 142. The power supply device 141 is electrically connected to the power connector 130 for providing power to the optical engine 120. The wireless communication device 142 is electrically connected to the optical engine 120 and is configured to wirelessly connect with an external signal source, to receive an image signal provided by the external signal source, and to provide an image signal to the optical engine 120. The external signal source may include the image signal or a sound signal. The wireless communication device 142 may adopt Wi-Fi or other wireless communication protocol to connect with the external signal source. Therefore, when the material of the rear end portion 110b of the housing 110 includes the plastic, the wireless communication device 142 would not be influenced by the rear end portion 110b of the housing 110 during the operation.

Referring to FIG. 1, in the present embodiment, the housing 110 has a plurality of through holes 110f for communicating the inside of the housing 110 with the outside of the housing 110. The through holes 110f may be formed at the rear end portion 110b of the housing 110, but the invention is not limited thereto. The through holes 110f may provide heat dissipation, such that the hot air within the housing 110 can be discharged through the through holes 110f. In one embodiment, the through holes 110f may also provide for sound output, such that sounds generated within the housing 110 can be outputted through the through holes 110f.

Referring to FIG. 1, the power connector 130 connected to the rear end portion 110b of the housing 110 is used to plug into the power supply socket to supply power to the optical engine 120, and thus a projecting direction of the image beam I projected from the projection lens 124 can be altered in accordance with the location of the power supply socket (not shown).

Referring to FIG. 1, in the present embodiment, the power connector 130 may be an E27 lamp cap (a lamp cap (base) with a screw diameter of 27 mm), which is commonly applied in a lamp connection interface, which can be correspondingly connected to an E27 lamp holder (lamp socket; as the power supply socket; not shown), but the invention is not limited thereto. The power connector 130 may also use a lamp cap of other specification, such as an E12, E14, or E17 lamp cap, to connect to a lamp holder of corresponding specification.

Figure 4:
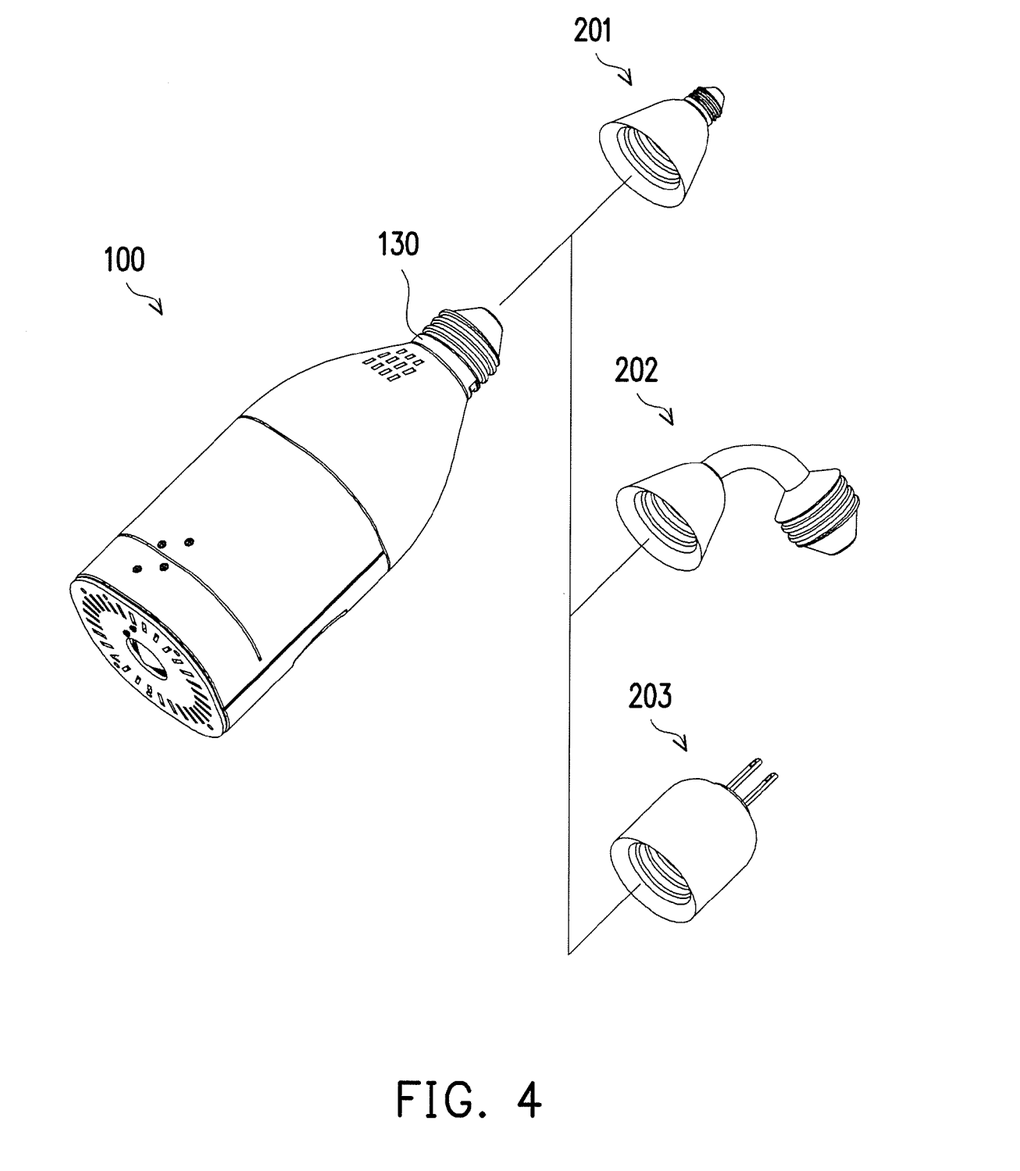
FIG. 4 is schematic diagram illustrating the projection device of FIG. 1 and a variety of connectors adapted to be used thereby.

Referring to FIG. 4, since the E27 lamp cap is widely used in different applications, when the power connector 130 is the E27 lamp cap, it can be converted to the lamp cap of other specification via a converter 201, or the projecting direction of the projection device 100 may be adjusted via an extender 202, or it can be changed into a form of an power plug via an adapter 203. Therefore, when the power connector 130 is the E27 lamp cap, the application of the projection device 100 can further broadened by the use of a lamp connecting interface with E27 specification.

Figure 5A:
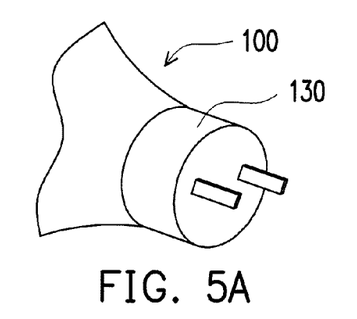
FIG. 5A is a partial perspective view illustrating a projection device according to another embodiment of the invention.
Figure 5B:
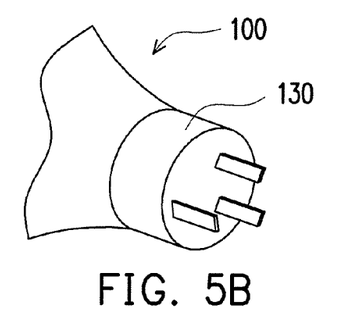
FIG. 5B is a partial perspective view illustrating a projection device according to another embodiment of the invention.
Figure 5C:
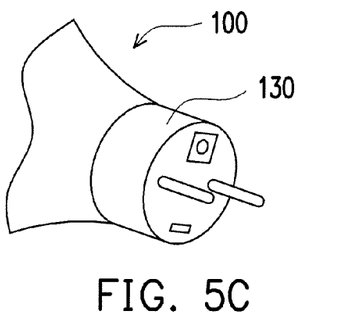
FIG. 5C is a partial perspective view illustrating a projection device according to another embodiment of the invention.
Figure 5D:
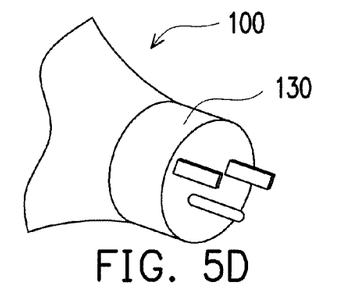
FIG. 5D is a partial perspective view illustrating a projection device according to another embodiment of the invention.

Referring to FIG. 5A, in addition to the form of a lamp cap, the power connector 130 of the projection device 100 may also be a power plug, more particularly, an indoor use power plug, and is adapted to plug into a socket (power supply socket; not shown). In the present embodiment, the power connector 130 is a power plug complied with Taiwan specification. In another embodiment, as shown in FIG. 5B, the power connector 130 is a power plug complied with China specification. In another embodiment, as shown in FIG. 5C, the power connector 130 is a power plug complied with European specification. In another embodiment, as shown in FIG. 5D, the power connector 130 is a power plug complied with US specification. Nevertheless, the invention is not limited to the power plugs of above-mentioned specifications, and may include the power plugs complied with specifications of other nations.

The embodiments of the invention may have one of the following advantages. The mutual influence between the temperatures of the two light-emitting elements can be reduced by thermally coupling the two light-emitting elements to the two adjacent coupling portions of the housing and by separating the two adjacent coupling portions using a heat separation. The light-emitting elements thermally coupled to the housing can be cooled directly through the housing, and disposition of a fan can be omitted, thereby reducing the noise.

Moreover, the power connector is connected to the rear end portion of the housing and can be directly plugged into the power supply socket to obtain power, and thus the projecting direction of the image beam projected from the projection lens can be altered in accordance with the location of the power supply socket. Furthermore, the power connector can be in the form of a lamp cap (e.g., the E27 lamp cap) or a power plug (e.g., power plugs complied with specifications of different nations), so as to increase the range of applications.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection device, comprising:
    a housing, having a front end portion, rear end portion opposite to the front end portion and a projection opening;
    an optical engine, disposed within the housing and comprising a projection lens, a first light-emitting element, and a second light-emitting element, wherein the projection lens is adapted to output an image beam through the projection opening, the first light-emitting element and the second light-emitting element are respectively thermally coupled to a first coupling portion and a second coupling portion of the housing, and the housing has a heat separation for separating the first coupling portion and the second coupling portion; and
    a power connector, connected to the rear end portion of the housing.

2. The projection device of claim 1, wherein the heat separation comprises an elongated slot, and the elongated slot is located between the first coupling portion and the second coupling portion.

3. The projection device of claim 2, wherein the elongated slot is extended between the first coupling portion and the second coupling portion.

4. The projection device of claim 2, wherein the elongated slot is tortuously extended between the first coupling portion and the second coupling portion.

5. The projection device of claim 1, wherein the heat separation comprises a plurality of slots, and the slots are arranged along a line between the first coupling portion and the second coupling portion.

6. The projection device of claim 5, wherein an extending direction of the slots is parallel to the line.

7. The projection device of claim 5, wherein an extending direction of the slots is oblique to the line.

8. The projection device of claim 1, wherein the housing comprises a front end plate, and the projection opening is formed at the front end plate.

9. The projection device of claim 8, wherein the front end plate comprises a plurality of cooling vents, and the cooling vents arranged around the projection opening.

10. The projection device of claim 8, wherein the optical engine further comprises a third light-emitting element, and the third light-emitting element is fixed to the front end plate.

11. The projection device of claim 1, wherein a material of the front end portion comprises metal, and a material of the rear end portion comprises plastic.

12. The projection device of claim 1, wherein the housing has a plurality of through holes formed at the rear end portion for communicating the inside of the housing with the outside of the housing.

13. The projection device of claim 1, wherein the power connector is an E27 lamp cap.

14. The projection device of claim 1, wherein the power connector is a power plug.

15. The projection device of claim 1, further comprising:
    an electronic device disposed within the housing and electrically connected to the optical engine and the power connector.

16. The projection device of claim 15, wherein the electronic device comprises a power supply device and a wireless communication device,
    the power supply device is electrically connected to the power connector and is configured to provide power to the optical engine, and
    the wireless communication device is configured to wirelessly connect to an external signal source, to receive an image signal provided by the external signal source, and to transmit the image signal to the optical engine.

17. The projection device of claim 1, wherein there is no fan within the housing.

* * * * *